United States Patent Office 2,873,892
Patented Feb. 17, 1959

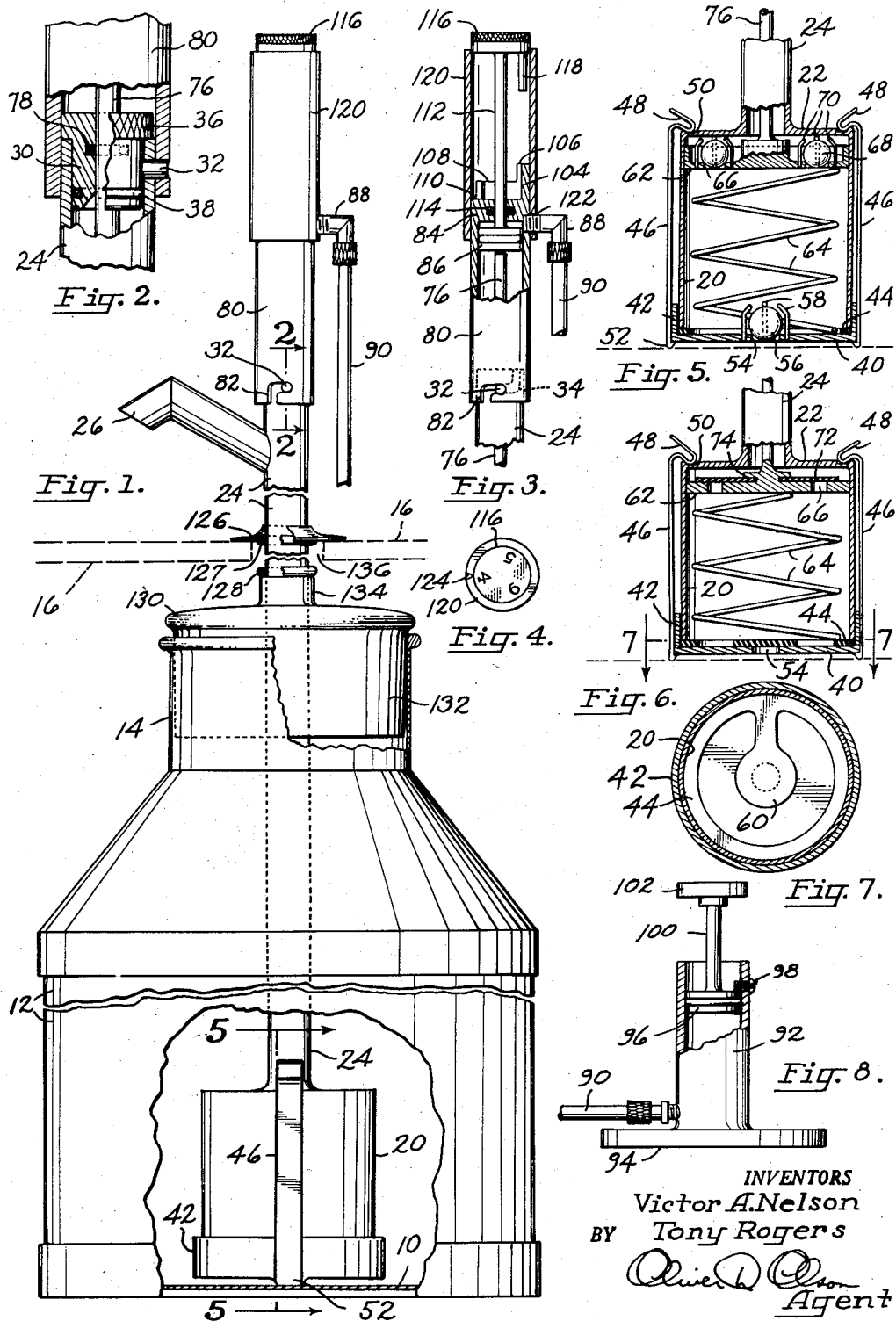

2,873,892

DISPENSER FOR LIQUIDS

Victor A. Nelson, Portland, and Tony Rogers, Milwaukie, Oreg.

Application December 10, 1956, Serial No. 627,169

5 Claims. (Cl. 222—309)

This invention pertains to dispensers for liquids, and relates particularly to the novel construction of a dispenser for liquid foods which are required to be measured in predetermined quantities.

Because of the sanitation requirement imposed upon such commercial establishments as restaurants and soda fountains, the preparation of food drinks such as milk shakes heretofore has involved the manual ladling of a required quantity of milk from a bulk storage supply. This procedure has been followed primarily because there has not been available heretofore a mechanical dispenser capable of being cleansed with practicable facility and to the thoroughness required by sanitation codes. Hence, the ladling procedure has continued, with the attending congestion in the working area, inaccuracies of measurements and loss of valuable time.

There are available large cabinet model dispensers which incorporate refrigerating units. However, these dispensers do not provide automatic measuring of a predetermined quantity of liquid. Furthermore, they cannot dispense iced milk which, at the desired temperature of 32° F., contains a suspension of ice particles. Moreover, such cabinets are bulky in size and therefore are not suitable for use in the characteristically confined quarters of a soda fountain. Still further, they are expensive and therefore not available to the majority of establishments which operate on more limited financial budgets.

Accordingly, it is a principal object of the present invention to provide a dispenser for liquid foods, which dispenser may be cleaned with speed and facility and to the degree of thoroughness required by sanitation codes.

Another important object of this invention is the provision of a dispenser capable of metering a predetermined quantity of liquid food, the dispenser being particularly suited to the dispensing of iced milk.

A further important object of the present invention is to provide a liquid food dispenser which may be operated without the use of hands and, if desired, from a remote position.

Still another important object of the present invention is to provide a dispenser for liquid foods, which dispenser is compact in size and is capable of being mounted in a conventional ice cream refrigerating compartment.

A further important object of this invention is to provide a dispenser which is adjustable to meter varying amounts of liquid.

A still further important object of the present invention is to provide a dispenser which is of simplified construction for economical manufacture, which is operated with facility and precision, and which is capable of assembly and disassembly with maximum speed and ease.

The foregoing and other objects and advantages of this invention will appear from the following detailed description, taken in connection with the accompanying drawing, in which:

Figure 1 is a foreshortened view in elevation of a dispenser embodying the features of the present invention, the same being shown mounted in a conventional milk can;

Figure 2 is a sectional view taken along the line 2—2 in Figure 1 and showing details of construction of the end seal and hydraulic actuator coupling;

Figure 3 is a fragmentary view in elevation, partly in section, showing details of construction of a hydraulic actuator for the dispenser;

Figure 4 is a top plan view of the metering adjustment control of the dispenser shown in Figure 1;

Figure 5 is a sectional view taken along the line 5—5 in Figure 1 and showing details of construction of the dispenser pump;

Figure 6 is a sectional view, similar to Figure 5, showing a modified valve construction for the dispenser pump;

Figure 7 is a sectional view taken along the line 7—7 in Figure 6; and

Figure 8 is a view in elevation, partly in section, of a remote foot control for the hydraulic actuator.

As mentioned hereinbefore, the dispenser of the present invention is adapted particularly to be installed in a conventional commercial milk can which, in turn, is capable of being contained within a conventional ice cream refrigerating cabinet. Thus, in the drawing there is shown a conventional milk can having a bottom 10, a cylindrical wall 12 and a neck 14 of reduced diameter. The milk can is adapted to be contained within an ice cream refrigerating cabinet (not shown), preferably of the compartment type in which a pair of removable covers 16 are provided for sealing each of the compartments.

In accordance with the present invention, the dispenser includes a cylinder 20 which, in the preferred construction illustrated, is open at its bottom end and closed at its upper wall 22. Secured to or otherwise formed integral with the cylinder and projecting upwardly from the center of the upper wall is an elongated tube 24. The upper wall is apertured at its center so as to provide communication between the interior of the cylinder and the tube. Adjacent the upper end of the tube there is attached as a lateral extension thereof an outlet spout 26, the opening in which communicates with the inner bore of the tube.

The upper end of the tube is releasably sealed by a plug 30 which is provided with a laterally extending pin 32 which is adapted to be secured in the angular locking slot 34 (Figure 3) provided in the upper end of the tube. The plug is provided with a cap end 36 of enlarged diameter which is preferably knurled on its periphery. A resilient sealing ring 38 is mounted in an annular groove in the plug adjacent the bottom end of the latter to form a liquid tight seal between the tube and plug.

The bottom end of the cylinder 20 is removably closed by means of an end cap 40 which is provided with an upstanding annular wall 42, the inner diameter of which is slightly larger than the outer diameter of the cylinder. An annular resilient ring 44 is interposed between the bottom edge of the cylinder and the cap to form a liquid tight seal.

Welded or otherwise secured to or formed integral with the cap wall 42 and extending upwardly therefrom, preferably at diametrically opposite sides of the latter, is a pair of resilient strap members 46 each of which terminates at its upper end in an inward reverse bend. These terminal ends form spring clips 48 which are adapted to snap into seating arrangement in an annular groove 50 formed in the top wall of the cylinder adjacent the periphery of the latter. In this manner the cap is releasably secured to the cylinder.

Secured to or otherwise formed integral with the cap and projecting downwardly therefrom are a plurality of foot elements 52 which function to support the cylinder assembly upon the bottom of the milk can with the bottom cap elevated above the bottom of the milk can sufficiently to permit liquid to pass therebetween. In the embodiment illustrated, these foot elements are formed by the extending ends of the resilient strap members 46.

The bottom cap is provided with a central aperture 54 which functions as an inlet opening to the interior of the cylinder 20. This aperture is releasably closed by a valve. In the embodiment illustrated in Figure 5, this valve comprises a ball 56 which is arranged to seat removably in the aperture and is permitted an adequate vertical displacement from the aperture by means of the confining pins 58 which project upwardly from the cap 40 at circumferentially spaced intervals about the aperture.

In the embodiment illustrated in Figures 6 and 7, the closure valve for the aperture is provided in the form of a tongue 60 which is formed as an integral part of and projects radially inward from the sealing rim 44.

Mounted slidably within the cylinder is a plunger 62 which is normally urged resiliently toward the top wall 22 of the cylinder by means of a coil spring 64 interposed between the plunger and the bottom cap 40. The plunger is provided with a plurality of circumferentially spaced openings 66 therethrough which function to permit passage of liquid from under the plunger to the top side thereof. These openings in the plunger are releasably closed by means of a valve which, in the embodiment illustrated in Figure 5, comprises a ball 68 releasably seated in each opening and permitted an adequate degree of vertical displacement therefrom by means of confining pins 70 arranged about the opening in the manner of the pins 58 previously described.

In the embodiment illustrated in Figure 6, the openings in the plunger are releasably sealed by a valve constructed in the form of a flexible flat disc 72, for example of rubber, which overlies the plunger and is releasably secured adjacent the center thereof in an annular groove formed in the upstanding central pedestal 74 of the plunger. The disc is sufficiently resilient to permit enlarging of its central opening for removal of the disc from said annular groove, for purpose of cleaning.

Secured to the plunger and extending upwardly through the tube 24 is a plunger rod 76. This rod is substantially smaller in diameter than the inner diameter of the tube, to permit the passage of liquid through the tube to the outlet spout 26. The plunger rod extends through a longitudinal bore in the plug 30 and terminates above the latter a distance at least equal to the maximum stroke of the plunger 62. A resilient sealing ring 78 is mounted in an annular groove in the plug to form a liquid seal between the plunger rod and the plug.

In the preferred embodiment illustrated in the drawing, means is provided for operating the dispenser from the remote position. Such means preferably is provided in the form of a releasable attachment to the top end of the tube 24, and comprises a hydraulic operator for the plunger rod 76, the hydraulic operator being controlled from a remote position.

In the embodiment illustrated in the drawing, the hydraulic operator attachment comprises a sleeve 80 adapted to fit slidably over the upper end of tube 24 and to be secured to the latter by means of the angular slot 82 provided in the lower end of the sleeve and arranged to receive the projecting end of pin 32 which extends from the sealing plug 30.

The sleeve is sealed adjacent but below its upper end by means of a tranverse wall 84. Mounted slidably within the lower section of the sleeve is a piston 86, the under side of which rests in abutment with the upper end of the plunger rod 76. A conduit connection 88 is mounted in the sleeve at a point adjacent the under side of the transverse sealing wall and above the upper surface of the piston, and a conduit 90 extends from said connection to a hydraulic pump, shown in Figure 8.

The hydraulic pump comprises a cylinder 92 mounted upon a base 94 and extending vertically upward therefrom. The conduit 90 is connected to the cylinder adjacent the bottom end of the latter. A piston 96 is mounted slidably within the cylinder for reciprocal movement between the conduit connection and an upper abutment which, in the embodiment illustrated, comprises a screw 98 removably threaded in an opening adjacent the upper end of the cylinder. A piston rod 100 extends upwardly from the piston and terminates at its upper end in a foot pedal 102. It is contemplated that the primary hydraulic source will be placed upon the floor adjacent the refrigerating cabinet, and that the operator will actuate the same by stepping upon the pedal to force the piston downward and thus express hydraulic fluid from the pump to the plunger operating attachment.

Means also is provided for adjusting the quantity of liquid discharge from the dispenser, by adjusting the limit of movement of the plunger 62 within the cylinder 20. In the embodiment illustrated, such means comprises the arcuate extension 104 or sleeve 80 projecting upwardly from the transverse sealing wall 84. The extension 104 is notched to terminate at two levels 106 and 108. Each level preferably extends a circumferential distance of 120 degrees. A third level is provided by the upper surface 110 of the transverse sealing wall 84.

A stem 112 is secured at its lower end to the piston 86 and projects upwardly therefrom through a central bore in the transverse wall 84. A sealing ring 114 is provided in the transverse wall to form a fluid seal between said wall and the stem, to prevent the escape of hydraulic fluid from above the piston. Secured to the upper end of the stem is a knurled control knob 116. A pin 118 depends from the under side of the knob vertically above the stepped arcuate levels 106 and 108. The extension 104, the stem 112 and pin 118 preferably are concealed from view by means of the cylindrical shield 120 which is secured to the sleeve by means of the conduit connection 88 which projects through an opening 122 in the shield.

As best shown in Figure 4, there is inscribed upon the upper surface of the knob 116, at 120 degree intervals, the designations of fluid ounces which, in the embodiment illustrated, are indicated to be 4, 5 and 6 ounces. An index mark 124 is provided on the upper edge of the shield 120, and this is positioned in such manner that the pin 118 will be in registry with the proper adjustment level 106, 108 or 110 to provide for dispensing of the designated amount of fluid from the cylinder 20.

The dispenser may also be operated manually by direct application of hand pressure to the plunger rod 76, rather than by the remote system described hereinbefore. This may be accomplished by removing the conduit connection 88 from sleeve 80, whereupon the shield 120 may be removed to permit application of hand pressure to the knob 116 for manual operation of the plunger 62. Since the index mark 124 is aligned with the dispenser spout 26 when the shield 120 is in use, the spout may serve as the index mark for the numerals on the knob 116 during manual operation.

As mentioned hereinbefore, the dispenser of this invention preferably is used in cooperation with a conventional milk can, mounted in a conventional ice cream refrigerating cabinet. Thus, prior to connection of the tube 24 to the pump cylinder 20, there is assembled upon the tube in freely sliding arrangement therewith, an annular trim flange 126, a pair of resilient sealing rings 127 and 128, and a milk can lid 130. In its preferred form, the milk can lid is provided with a downwardly projecting cylindrical wall 132 which is tapered slightly inward in the downward direction, whereby to accommodate reasonable variations in the diameter of the opening in the milk can neck 14, and thus form an efficient closure for the can. A hollow hub 134 projects upwardly from the lid to form a sliding support for the tube 24.

With the pump installed in the milk can and the latter deposited in a compartment of an ice cream refrigerating cabinet, the pair of covers 16 for the ice cream compartment are placed in position. These covers are adapted separately to be installed within the cabinet opening and to abut along adjacent edges. A central opening is formed on this line of abutment by providing semicircular notches 136 in the adjacent edges of the covers through which the dispenser tube 24 extends. The trim flange 126 is drawn downwardly to cover this opening in the covers, and the resilient sealing ring 128 is brought into abutment with the upper end of the lid hub 134 to prevent entrance of water into the milk can.

The operation of the herein described dispenser, for example in the dispensing of a predetermined quantity of iced milk, is as follows:

Assuming that the dispenser has been assembled for remote operation by the foot operated hydraulic power unit positioned on the floor adjacent the dispenser, the operator adjusts the control knob 116 in relation to the index mark 124 for the desired quantity of milk to be dispensed into a container, which the operator holds under the dispensing spout 26. The operator then steps upon the foot pedal 102, thereby depressing the piston 96 and forcing hydraulic fluid out of the cylinder and through the conduit 90, into the space above the piston 86. The latter thereupon is caused to move downward, moving the plunger rod 76 with it and thus moving the dispenser plunger 62 downward in the cylinder 20 against the compression of coil spring 64. Assuming that the cylinder was inititally filled with milk by virtue of a preceding dispensing cycle, the milk contained in the cylinder is forced through the openings 66 in the plunger, past the valve associated with said openings, into the space above the plunger. The inlet opening 54 is sealed during this portion of the cycle by the valve associated therewith.

When the pin 118 on the control knob engages the selected stepped surface 106, 108 or 110, further downward movement of the piston is halted, and the dispenser plunger has reached the position at which the selected quantity of milk now is contained above said plunger. The operator now releases the foot pedal 102 of the hydraulic power source, whereupon the coil spring 64 within the dispenser cylinder forces the plunger upwardly. The valves in the plunger having now closed the opening 66, the milk is forced upwardly through the tube 24 and out the discharge spout 26, the required quantity of milk thus being dispensed when the plunger reaches its upper limit of travel.

During upward travel of the dispenser plunger, under the influence of the coil spring 64, a partial vacuum is created on the under side of the plunger, and hence the milk contained in the milk can, being at a higher pressure, forces open the valve closing the inlet opening 54 and fills the cylinder space under the preceding plunger.

During upward movement of the plunger by the coil spring 64, the hydraulic actuator piston 86 also is forced upwardly, and the hydraulic fluid above it is forced back through the conduit 90 and into the cylinder of the foot power unit. The foot pedal 102 and attached piston thus are elevated at their normal rest position.

It will be noted that a particular advantage of the herein described dispenser in the dispensing of milk for milk shakes, resides in the fact that the milk-containing cylinder 20 is positioned at the bottom 10 of the milk can, at the location of most efficient refrigeration of the ice cream cabinet. For this particular use, the refrigerated cabinet is maintained at a temperature of about 32° F., at which temperature the milk contains a suspension of ice particles. When a quantity of iced milk has been dispensed from the spout 26 and the dispenser plunger returned to its normal elevated position, the cylinder 20 is refilled with iced milk from the milk can, and this quantity of iced milk remains at the desired temperature until a subsequent dispensing operation, thus assuring the dispensing of milk at the proper temperature.

The dispenser of the present invention is capable of complete disassembly with speed and facility, to afford thorough and effective cleansing of the various parts. Maximum sanitation is maintained, not only by virtue of such complete disassembly, but also because of the absence of threaded connections between the parts which are subject to contact by milk or other liquid dispensed thereby.

From the foregoing it is believed to be apparent that the present invention provides a dispenser which is compact in size for convenient mounting in a conventional milk can and ice cream refrigerating cabinet; which is particularly suited to the dispensing of milk which contains particles of ice; which is capable of complete disassembly for thorough cleansing in compliance with sanitation codes; and which is of simplified construction and therefore economical to manufacture. Thus, the present invention provides to soda fountains and other similar establishments a metering dispenser which is accurate in operation, affords easy and thorough cleansing, is an inexpensive investment, and utilizes no additional space since it is accommodated within the space of the ice cream refrigerating cabinet. The dispenser also affords the advantage of remote control by such means as the foot control described, thereby leaving the hands of the operator free for other use and avoiding the physical exertion attending hand operation of the dispenser.

It will be apparent to those skilled in the art that various changes may be made in the details of construction described hereinbefore without departing from the scope and spirit of this invention. For example, other fluid pressure media, such as compressed air, may be used in place of the hydraulic fluid exemplified herein. As another example of modification, the remotely controlled hydraulic fluid actuating systems described herein may be replaced by electrically actuated systems, such as a solenoid system in which, for example, a solenoid armature performs the function of the piston 86 and in which a control push button switch in the electric circuit may be arranged for actuation from a remote position. It will be apparent further that the arcuate stepped extension 104 may be secured to the detachable plug 30 and the pin 118 attached to the piston 86, in which case the control knob 116 functions to rotate the piston 86 to orient the pin 118 properly with respect to the stepped adjustment levels. This latter construction also permits manual operation of the dispenser by removing the entire attachment including sleeve 80 and rotatably securing to the upper end of plunger rod 76 a cap carrying a pin to perform the function of pin 118. It will be understood, of course, that in any case the positions of the extension 104 and pin 118 may be reversed if so desired.

Since the foregoing and other changes may be made within the spirit of this invention, it is to be understood that the foregoing description is primarily illustrative of the invention and is not to be considered as limiting the scope thereof.

Having now described our invention and the manner in which the same may be used, what we claim as new and desire to secure by Letters Patent is:

1. A dispenser for liquids, comprising a dispenser pump cylinder having top and bottom end closure members, an inlet opening in the bottom end closure member, an outlet opening in the top end closure member, an outlet tube secured to the top end closure member and communicating with said outlet opening, a container having a bottom end and an open top end of larger dimension than the dispenser cylinder, whereby to receive the latter therethrough for support upon the container bottom, a container cap having a central hollow hub for receiving the outlet tube freely therethrough, a downwardly tapered wall on the container cap for frictionally engaging the inner surface of the container top opening, and downwardly projecting foot elements on the bottom end closure member for elevating the latter above the container bottom.

2. A dispenser for liquids, comprising a dispenser pump cylinder having top and bottom end closure members, an inlet opening in the bottom end closure member, an outlet opening in the top end closure member, an outlet tube secured to the top end closure member and communicating with said outlet opening, a discharge spout communicating with and extending laterally from the outlet tube below the upper end of the latter, a plunger movable longitudinally in the cylinder, a plunger actuating rod secured to the plunger and extending through the outlet tube, a sleeve adapted to be secured detachably to said outlet tube above the discharge spout and to project upwardly therefrom as an extension thereof, a transverse sealing wall in the sleeve a spaced distance above the bottom end thereof, a piston movable longitudinally in said sleeve below the transverse sealing wall and arranged to engage the upper end of the actuating rod, fluid pump means adapted to be positioned remotely from the sleeve, and fluid conduit means interconnecting the fluid pump means and the sleeve between the transverse sealing wall and piston, whereby to drive the plunger in its downward direction by the fluid pump means.

3. The dispenser of claim 2 including normally spaced adjustable abutment means operatively interengaging the piston and outlet tube upon a predetermined downward movement of the piston, whereby to limit the downward travel of the plunger.

4. The dispenser of claim 2 including stop means projecting upwardly from the transverse sealing wall and arranged in arcuate steps of varying height, a stem secured to the piston and extending upwardly therefrom rotatably through the transverse sealing wall, a knob mounted on the upper end of the stem, and a pin projecting downwardly from the knob and arranged for selective engagement with the steps of the stop means for adjusting the downward travel of the plunger.

5. A dispenser for liquids, comprising, a cylinder having at least one detachable end closure member, clamp means releasably interconnecting the cylinder and detachable end closure member, the bottom end of the cylinder having an inlet opening therethrough, valve means releasably closing said inlet opening, the top of the cylinder having an outlet opening therethrough, a plunger movable longitudinally within the cylinder and having an opening longitudinally therethrough, valve means releasably closing said plunger opening, resilient spring means in the cylinder normally urging the plunger toward the outlet opening, an outlet tube secured to the cylinder top end closure and communicating with the outlet opening, a discharge spout communicating with and extending laterally from the outlet tube below the upper end of the latter, detachable plug means sealing the upper end of the outlet tube, a plunger actuating rod secured to the plunger and extending slidably through the outlet tube and plug means, a sleeve adapted to be secured detachably to said outlet tube above the discharge spout and to project upwardly therefrom as an extension thereof, a transverse sealing wall in the sleeve a spaced distance above the bottom end thereof, a piston movable longitudinally in said sleeve below the transverse sealing wall and arranged to engage the upper end of the actuating rod, normally spaced adjustable abutment means operatively interengaging the piston and outlet tube upon a predetermined downward movement of the piston, whereby to limit the downward travel of the plunger, hydraulic fluid pump means adapted to be positioned remotely from the sleeve, and hydraulic fluid conduit means interconnecting the hydraulic fluid pump means and the sleeve between the transverse sealing wall and the piston, whereby to drive the latter in its downward direction by the hydraulic fluid pump means.

References Cited in the file of this patent

UNITED STATES PATENTS

| | | |
|---|---|---|
| 813,899 | Keene | Feb. 27, 1906 |
| 1,874,612 | Peterson | Aug. 30, 1932 |
| 2,294,236 | Levernier | Aug. 25, 1942 |
| 2,548,752 | Titus | Apr. 10, 1951 |
| 2,741,994 | Dann | Apr. 17, 1956 |